United States Patent [19]

Lawrence et al.

[11] Patent Number: 5,022,760
[45] Date of Patent: Jun. 11, 1991

[54] COMPOUND RESONATOR FOR IMPROVING OPTIC GYRO SCALE FACTOR

[75] Inventors: Anthony W. Lawrence, Walpole; Joseph J. Danko, Franklin, both of Mass.

[73] Assignee: Northrop Corporation, Hawthorne, Calif.

[21] Appl. No.: 497,955

[22] Filed: Mar. 22, 1990

[51] Int. Cl.$^5$ ............................................. G01B 9/02
[52] U.S. Cl. ................................... 356/350; 372/94; 372/97
[58] Field of Search .................... 356/350; 372/94, 97

[56] References Cited

U.S. PATENT DOCUMENTS

| | | | |
|---|---|---|---|
| 4,120,587 | 10/1978 | Vali et al. | 356/350 |
| 4,326,803 | 4/1982 | Lawrence | 356/350 |
| 4,521,110 | 6/1985 | Roberts et al. | 356/350 |
| 4,630,885 | 12/1986 | Haavisto | 356/350 |
| 4,632,555 | 12/1986 | Malvern | 356/350 |
| 4,674,881 | 6/1987 | Lawrence et al. | 356/350 |
| 4,740,085 | 4/1988 | Lim | 356/350 |
| 4,830,495 | 5/1989 | SooHoo et al. | 356/350 |

*Primary Examiner*—Samuel Turner
*Attorney, Agent, or Firm*—Terry J. Anderson; Karl J. Hoch, Jr.; Robert B. Block

[57] ABSTRACT

Method and apparatus for tuning an optical gyroscope, such as a MOG, to an operating frequency within a predetermined range of operating frequencies. The method includes an initial step of providing a compound resonator structure having a first optical waveguide resonator [16] optically coupled to a laser [14]. There is also provided a second optical waveguide resonator [18] optically coupled to the first resonator. The second resonator is constructed to extract a significant amount of energy from the first resonator when a coresonance frequency condition exists with the first resonator and to extract an insignificant amount of energy from the first resonator when a coresonance frequency condition does not exist. The method includes a step of varying an output frequency of the laser to a first frequency where a coresonance frequency condition exists. The method also includes a step of further varying the output frequency of the laser to a second frequency where a resonance frequency condition exists within the first resonator and a coresonance frequency condition does not exist between the first and the second resonators. The second frequency is within the predetermined range of frequencies and is selected to provide a desired gyroscope scale factor.

10 Claims, 3 Drawing Sheets

COMPOUND RESONATOR FOR IMPROVING OPTIC GYRO SCALE FACTOR

FIELD OF THE INVENTION

This invention relates to method and apparatus for reducing micro-optic gyro scale factor error by a ratio equal to a finesse associated with a compound resonator.

BACKGROUND OF THE INVENTION

Commonly assigned U.S. Pat. No. 4,326,803, issued Apr. 27, 1982 and commonly assigned U.S. Pat. No. 4,674,881, issued June 23, 1987 relate to thin film laser gyroscopes, also known as micro-optic gyroscopes (MOGs). It can be shown that the thermal expansion of a MOG waveguide over a typical storage temperature range may cause an uncertainty in the gyro scale factor of the order of 500 ppm. For some applications, such as a spin stabilized projectile rate sensor, this uncertainty is too large. A typical maximum uncertainty that can be tolerated in such an application is only approximately 100 ppm.

For example, an output frequency of a thin film laser gyroscope is given by:

$$\text{Frequency} = (4A/(n^*\text{Lambda}^*p))\text{Omega},$$

where
A = resonator plan area,
n = effective refractive index in the light path,
Lambda = free space wavelength of the laser,
p = resonator perimeter, and
Omega = input rate.
The Scale Factor "S" is given by:

$$S = \text{Frequency}/\text{Omega} = 4A/(n^*\text{Lambda}^*p)$$
Hz/rad/sec, or counts/radian.

For a circular resonator:

$$S = p/(pi^*n^*\text{Lambda}).$$

If m is the longitudinal mode number, or the number of waves in the ring perimeter, then:

$$m^*\text{Lambda} = n^*p,$$

and $$S = m/(pi^*n^2).$$

Typically the value of n is known and, if n is a function of temperature, the MOG substrate temperature can be measured in order to derive a suitable compensation. However, the value of m is typically not well known. When the gyro is switched on the laser will lock to some resonance, the particular resonance depending on the laser's wavelength for peak output, on the width of the gain line, and on the resonators temperature. However, there are typically a large number of ring resonances in the laser's gain width which makes impossible an accurate prediction of which resonance will be selected by a laser locking servo.

It should be noted though that once the laser has locked to the resonator, the scale factor is fixed, and depends only on the value of n. That is, the scale factor is stable but its value is unknown.

A change in optical perimeter due to expansion with temperature is given by:

$$Dp = p^*\text{alpha}^*Dt$$

where:
Dp = change in perimeter (Delta p),
alpha = coefficient of linear expansion, and
Dt = change in temperature.

For a conventional optical material such as BK7 alpha = $7 \times 10^{-6}$/C. Assuming that the temperature varies from $-50$ to $+90$C, that is, 20 $\pm$70C, assuming a ring having a diameter of approximately 5 cm, so that p = 15 cm, letting Lambda = 0.8 micron, and letting the waveguide index of refraction = 1.5, then:

$$Dp = 15 \times (7 \times 10^{-6}) \times 70 = 73.5 \text{ micron, and}$$

$$n^*Dp = 110 \text{ micron}.$$

Differentiating Equation (1), $$Dm = (n/\text{Lambda})^*Dp = (1.5/0.8)^* 73.5.$$

Therefore the change in m, or Dm = 138 and $m = 2.8 \times 10^5$.

Thus, the scale factor variation for a fixed index of refraction is:
$DS/S = Dp/p = Dm/m = 138/(2.8 \times 10^5) = 0.0005$, i.e. 0.05%, or 500 ppm.

While 0.05% accuracy may be acceptable for certain applications it is not satisfactory for use in a system subject to continuous rates, such as spin-stabilized projectiles. For such a system it can be shown that the scale factor must be known to within a range of 50-100 ppm. This required scale factor range implies that Dm must be ten times smaller than that derived above, that is less than $\pm 14$ wavelengths.

In other words, each time the laser is switched on it must lock to the same mode number plus or minus 14 wavelengths. However, conventional MOG fabrication materials have an order of magnitude too large a thermal expansion characteristic to provide this range of wavelengths.

One possible solution is to employ a material with ten times lower expansion rate, such as Cervit, as does a ring laser gyroscope (RLG). However, techniques to fabricate the required waveguide structures on Cervit are presently not well characterized. Furthermore, relative to BK7, Cervit is more costly and more difficult to obtain.

Another possible solution is to provide a resonator having a factor of ten times the free spectral range of the typical resonator. However, a single ring resonator would be required to be ten times smaller and, as a result, the scale factor would be reduced as well. For these reasons a reduced diameter single ring resonator is not a viable solution.

In U.S. Pat. No. 4,120,587, Oct. 17, 1978, Vali et al. and in U.S. Pat. No. 4,521,110, June 4, 1985, Roberts et al. describe ring laser gyros in which two independent resonators are constructed. One resonator supports only a CW traveling wave and the other supports only a CCW wave. The intent is to avoid coupling the CW and CCW waves, thus avoiding lock-in. This concept relates only to "active" gyros, the RLG itself, not to a passive type of resonator structure. Furthermore, this technique does not provide a compound resonator.

In U.S. Pat. No. 4,830,495, May 16, 1989, SooHoo et al. describe a passive gyro having two resonators in one material block. The two resonators perform different functions and do not form a compound resonator. Specifically, one resonator forms a laser light source and the other forms a rotation measuring cavity.

In commonly assigned U.S. Pat. No. 4,740,085, Apr. 26, 1988, Lim describes means for compensating active laser gyros for errors caused by differences in CW and CCW beam intensity and by backscatter. His technique relates to a reduction of net backscatter by retro-reflection using external mirrors and does not create a compound resonator structure.

In U.S. Pat. No. 4,632,555, Dec. 30, 1986, Malvern describes the use of a compound resonator for the increase of the overall free spectral range of an active gyro. However, Malvern uses the compound resonator at all times in that he provides the resonator for a gas laser, integral to the resonator. As a result, the resonator is believed to exhibit a lower finesse, due to the losses in the compound resonator construction, with a consequent reduction in laser performance.

It is thus an object of the invention to provide a resonator having having an increased free spectral range without a reduction in scale factor.

It is another object of the invention to provide a compound resonator structure having a free spectral range increased by approximately an order of magnitude over a conventional single ring resonator by coupling together two resonators having a small difference in diameter and without a significant reduction in scale factor.

SUMMARY OF THE INVENTION

The foregoing problems are overcome and the objects of the invention are realized by a method and apparatus for tuning an optical gyroscope, such as a MOG, to an operating frequency within a predetermined range of operating frequencies. The method includes an initial step of providing a compound resonator structure having a first optical waveguide resonator optically coupled to a laser source. There is also provided a second optical waveguide resonator optically coupled to the first resonator. The second resonator is constructed to extract a significant amount of energy from the first resonator when a coresonance frequency condition exists with the first resonator and to extract an insignificant amount of energy from the first resonator when a coresonance frequency condition does not exist. The method includes a step of varying an output frequency of the laser source to a first frequency where a coresonance frequency condition exists. The method further includes a step of further varying the output frequency of the laser source to a second frequency where a resonance frequency condition exists within the first resonator and a coresonance frequency condition does not exist between the first and the second resonators. The second frequency is within the predetermined range of frequencies and is selected to provide a desired gyroscope scale factor.

BRIEF DESCRIPTION OF THE DRAWING

The above set forth and other features of the invention will be made more apparent in the ensuing Detailed Description of the Invention when read in conjunction with the attached Drawing, wherein.

DETAILED DESCRIPTION OF A PREFERRED EMBODIMENT OF THE INVENTION

Figure 1:
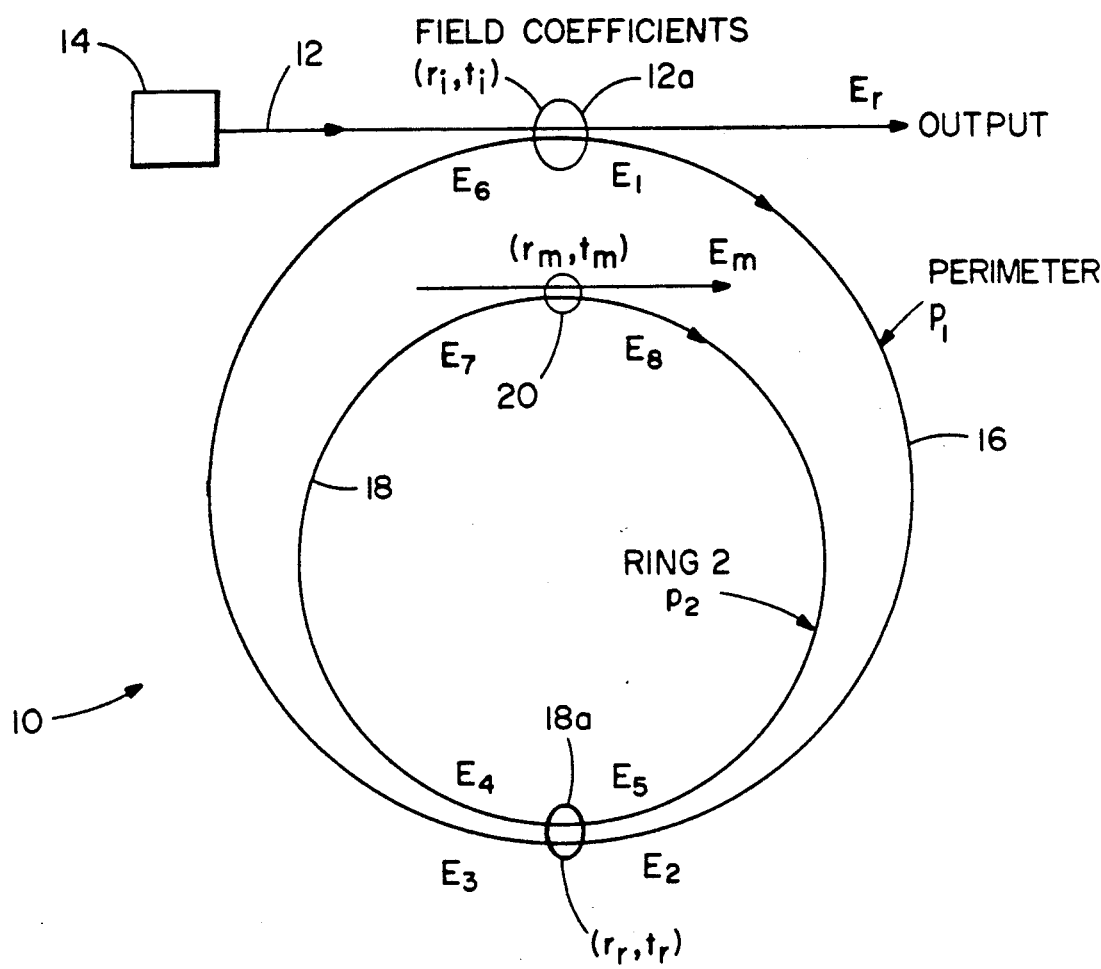
FIG. 1 is a simplified schematic drawing of the compound resonator constructed in accordance with the invention, including the field parameters associated therewith.

FIG. 1 illustrates a MOG compound resonator 10. An input waveguide 12 and associated coupler 12a couples light from a laser 14 in a conventional fashion, typically a semiconductor laser diode, into a waveguide rotation rate sensing ring 16. In accordance with the invention there is provided a second waveguide ring 18 that is coupled via an optical coupler 18a to ring 16. Ring 18 is also coupled to output coupler 20 which is also referred to herein as a "monitor port". Ring 16 functions as a measurement resonator, while ring 18 functions to ensure that a resonator mode within a predetermined range of mode numbers is initially selected, thereby providing accurate knowledge of MOG scale factor. In accordance with a preferred embodiment of the invention ring 18 is used only during initial laser locking, for reasons discussed below.

Figure 2:
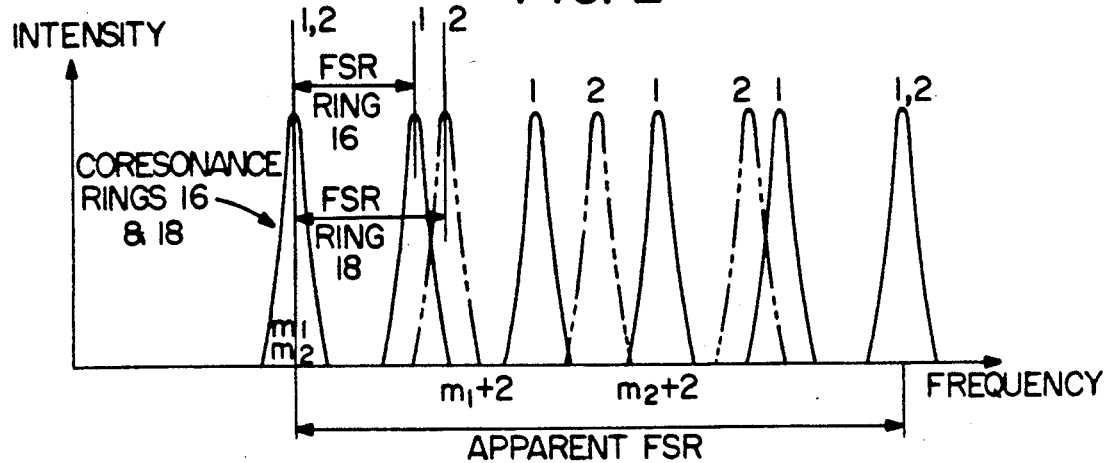
FIG. 2 is a graph that illustrates the ring resonances of the compound resonator of FIG. 1.

As depicted in FIG. 2 ring 16 resonates at frequencies in the laser gain range separated by its associated free spectral range ($FSR_1$) When ring 16 is in resonance it couples power into ring 18, which resonates at its own different "comb" of frequencies ($FSR_2$) However, resonance peaks are detectable at the monitor port 20 only when both the ring 16 and the ring 18 resonate at the same frequency, a condition referred to herein as "coresonance".

An estimate can be made of the beneficial effect of coresonance in improving knowledge of longitudinal mode number. First, it is assumed that the two resonances are distinguishable one from another when they are separated by one linewidth (the Rayleigh criterion). It is also assumed that the ring 16 and the ring 18 coresonate with a longitudinal mode number of $m_1$ in the ring 16 and a longitudinal mode number of $m_2$ in ring 18. Then, at mode $(m_1 + 1)$ the frequencies are separated by a line width (L).

The resonances once more coincide when $q*L = FSR_1$; that is when $q = FSR_1/L$, the finesse of ring 16. Therefore:

$$FSR_2 = FSR_1 + L; \text{ and } DS/S = Dp/p = 1/\text{Finesse}.$$

Thus, for a finesse of 20, the apparent FSR seen at the monitor port 20 increases by a factor of 20 (the finesse), and the scale factor error is reduced by a factor of 20.

The foregoing estimate can be confirmed by calculating the exact transfer functions of the MOG 10 as a function of frequency from the input port 12a to the output port 18a and the monitor port 20. However, the required equations are algebraically complicated, preventing an analytical solution from being obtained without considerable effort. Fortunately, a numerical solution is quite straightforward and as informative. As such, the equations for the system are preferably solved as described below.

For simplicity, both rings 16 and 18 have the same waveguide loss, a reasonable assumption in that they are fabricated in a single step from a single mask and on a common substrate. However, this is not a necessary assumption but merely one made for convenience.

The electric fields propagate around the ring waveguides 16 and 18 and have magnitude and phase values defined at points disposed on both sides of the couplers 12a, 18a and 20. The $E_n$ symbols depicted in FIG. 1 represent these electric field values. Also shown in FIG. 1 are the coupler parameters for reflection (r) and transmission (t) of the electric fields. In FIG. 1 the couplers 12a, 18a and 20 are shown half way around each ring waveguide, again a convenience rather than a necessity. The couplers can be arbitrarily positioned with only a slight modification to the analysis. That is, the effect of changing coupler placement is not functionally significant.

The analysis involves summing the values of the electric fields at selected points as an initially launched wave circulates in the rings 16 and 18. This wave from the laser 14 is partly reflected and partly transmitted into the ring 16 at the input coupler 12a. The transmitted field circulates back to the coupler 12a, where some of the field is transmitted out to join the first reflected component. The newly reflected field circulates once more around the ring 16, again reaches the input coupler 12a (some by way of the ring 18), and some of the wave passes through to join the other two fields. This process continues until the energy in the ring 16 drops to an insignificant amount, due to coupling out and waveguide losses. The net electrical fields at the MOG output, $E_r$, and the monitor port, $E_m$, are multiplied by their complex conjugates to give the output powers at each port.

A complication in this analysis arises from the electric fields coupled in and out of the ring 18. On the first circuit of radiation around the ring 16 an electrical field builds up in the ring 18 but this field does not contribute to the electrical field in the ring 16 until the second circuit. Therefore it is necessary to set up electrical fields from the first circuit and by a summing technique loop around for as many circuits as necessary for the $n^{th}$ field components to be negligible.

Having thus found the transmitted power for one frequency, the analysis next steps through a range of frequencies, calculating the output power for each frequency at both the MOG output port, that is the coupler 12a, and at the monitor port 20.

Figure 3:
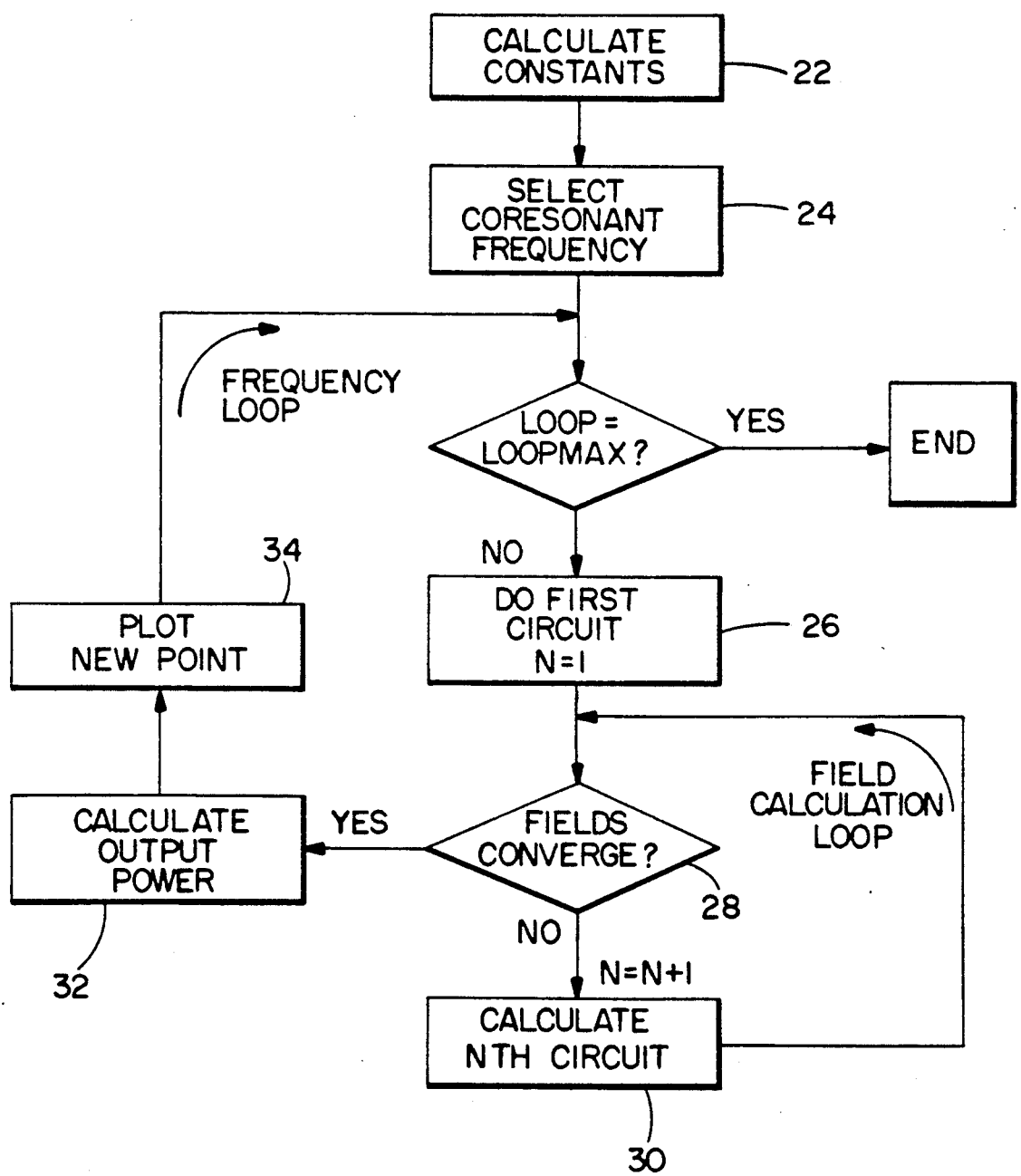
FIG. 3 is a block diagram that illustrates a method of determining a frequency response of the compound resonator of FIG. 1.
Figure 4:
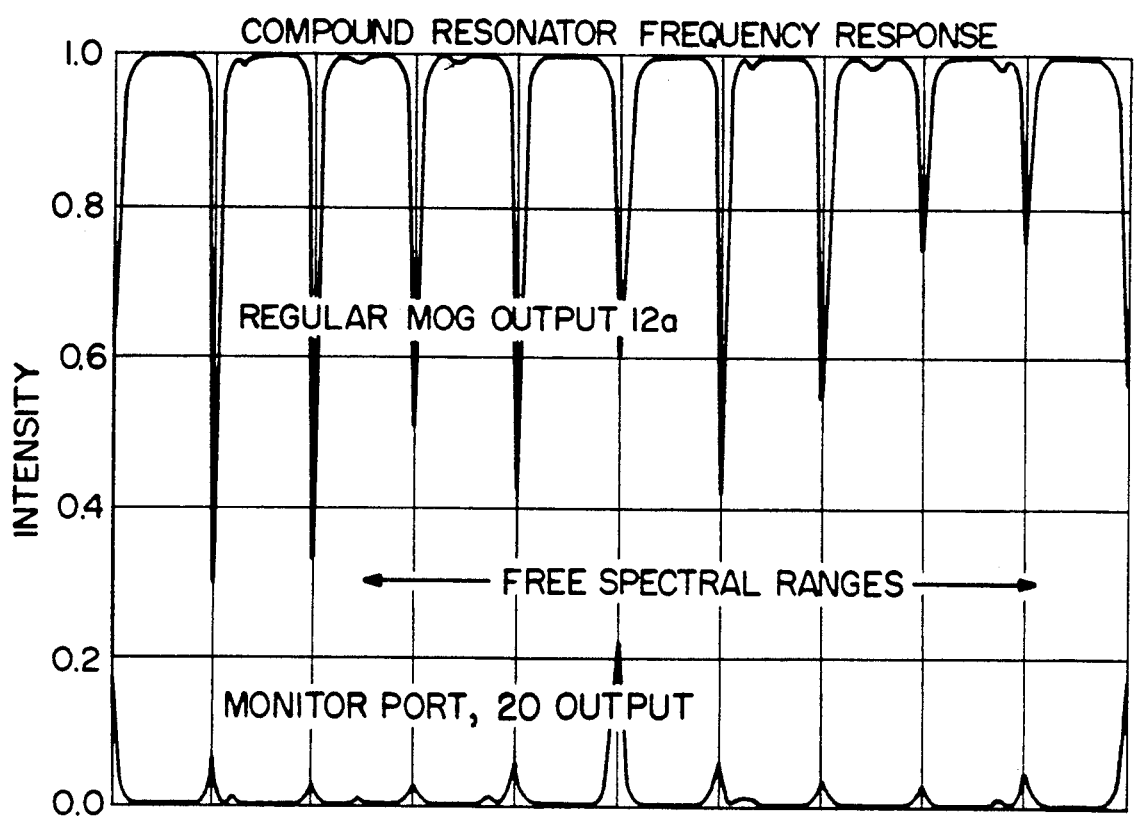
FIG. 4 is a graph illustrating the compound resonator frequency response calculated in accordance with the method of FIG. 3.

FIG. 3 shows a flow chart of this procedure. A first step 22 calculates the field constants parts and a second step 24 selects a starting frequency. For convenience, and to ensure that the method is working in a correct region a coresonance frequency is selected. At the first frequency there is calculated, step 26, the initial conditions for the first circuit. Next a field calculation loop, steps 28 and 30, is entered. Steps 28 and 30 are repetitively executed until the fields converge. For the analysis the fields are considered to converge when they differ by a factor of 0.001. When the fields converge the fields are summed, the complex conjugates are found, and the fields are multiplied by the respective complex conjugates to obtain the output powers for the ports (step 32). Preferably the output powers are plotted, step 34, to obtain a graph as depicted in FIG. 4. The method then continues in the frequency loop where a next frequency is selected.

FIG. 4 shows a plot of the aforedescribed analytical method made with the following parameters:
Diameter of Ring 16 = 25 mm,
Diameter of Ring 18 = 20 mm,
Waveguide loss = 0.05 dB/cm,
Waveguide index = 1.5,
Power coupling:
 input guide 12 to ring 16 = 0.05,
 ring 16 to ring 18 = 0.05,
 monitor port 20 = 0.2, and
Free space wavelength = 0.8 micron.

In FIG. 4 the y-axis is scaled in power relative to the laser 14 input power. The x-axis is scaled in free spectral ranges of the ring 16; the descending peaks are the typical MOG output dip seen at the output port 12a. The peaks rising from the bottom are the monitor port 20 resonances, which illustrate the phenomenon discussed above. In this example the effective FSR at the monitor port 20 is five times larger than the FSR of the ring 16.

FIG. 4 clearly illustrates that when the rings 16 and 18 coresonate the finesse of the ring 16 is lowered by loading from ring 18, thus making coresonance a less than optimum working point.

Figure 5:
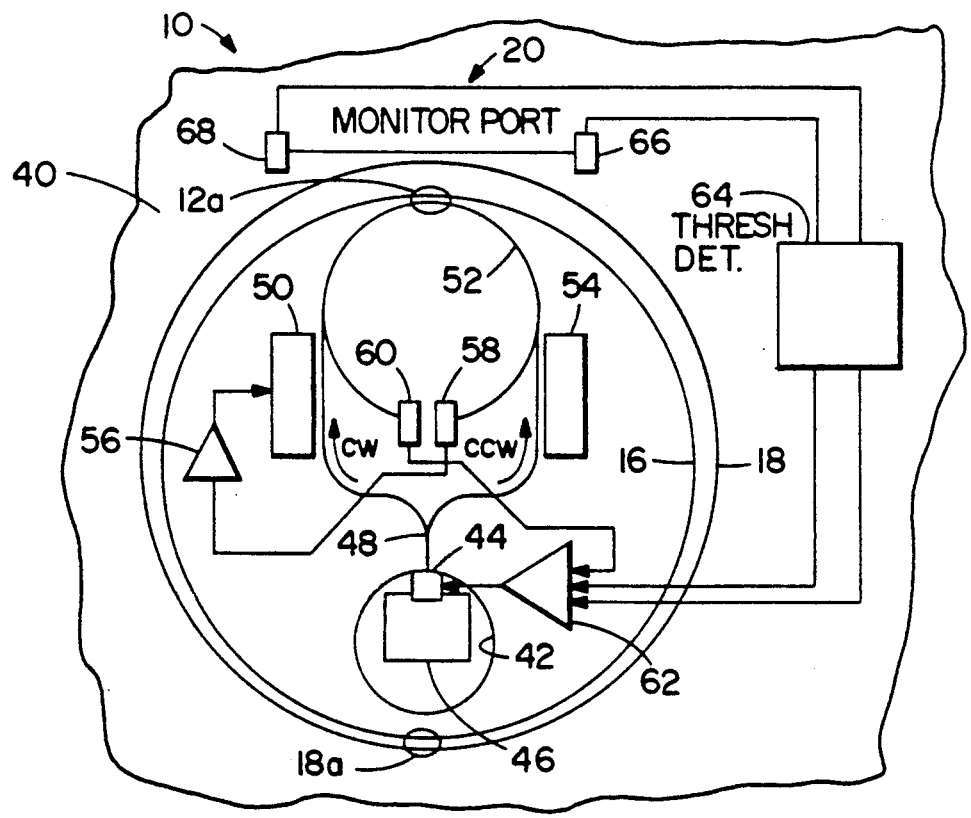
FIG. 5 is a partial schematic top view of a MOG structure constructed and operated in accordance with the invention.

FIG. 5 illustrates one embodiment of a compound MOG configuration that is useful in discussing a laser locking procedure. It should be noted that this embodiment has the ring diameters reversed from that of FIG. 1. That is, the rotation sensing ring 16 is of smaller diameter and is disposed inside of the ring 18.

In greater detail the MOG 10 is fabricated on a substrate 40 comprised, typically, of BK7. An opening 42 is made in the substrate 40 for mounting a semiconductor diode laser 44. Laser 44 is preferably mounted on a Peltier cooler device 46 for controlling the temperature of the laser 44 and hence bounding the radiation in the output wavelength and power. An output waveguide 48 conveys the laser radiation to a fork where one half of the radiation is provided past a first frequency shifting Surface Acoustic Wave (SAW) Bragg cell 50. This radiation is injected in a clockwise (CW) propagating direction around a waveguide 52. The other half of the laser radiation is launched in a counter-clockwise (CCW) direction around the waveguide 52 after passing a second SAW Bragg cell 54. SAW Bragg cell 54 induces a fixed, nominally 200 MHz, frequency offset into the laser frequency while SAW Bragg cell 50 is controlled by a driver 56 to induce a variable 200 MHz frequency offset into the CW beam. A CW detector 58 and a CCW detector 60 have outputs connected to the driver 56 and to a laser control servo amplifier 62, respectively. An output of servo amplifier 62 is provided to vary the laser 44 injection current, thereby varying the frequency of the laser 44.

In accordance with the invention the ring 18 and the monitor port 20 are provided, the ring 18 being optically coupled to the rotation sensing ring 16. The monitor port 20 includes a CW detector 66 and a CCW detector 68. Detectors 66 and 68 each have an output coupled, via a fixed threshold detector 64, to an input of the laser locking servo amplifier 62 for causing the amplifier 62 to vary the frequency of the laser 44 as is described below.

During operation, the MOG 10 operates in a conventional manner such that a rotation of the MOG 10 causes a shift in the resonances of the counter-propagating waves. A rotation-induced difference in the resonant frequency of ring 16 is detected by intensity changes at detectors 58 and 60, the frequency difference being proportional to the rotation rate. In general, at a resonance condition most of the laser energy passes into ring 16, resulting in a minimal detector output. However, when rotation induces an out-of-resonance condition the associated detector detects an increase in energy outcoupled from the ring 16. Fine tuning of the MOG 10 is accomplished with the SAW Bragg cell 50 while SAW Bragg cell 54 induces a fixed frequency offset or bias to permit measurements of rotations in both a CW and a CCW direction. The scale factor of the MOG 10 is determined by the longitudinal mode number of the resonator, as was discussed in detail above.

In accordance with a laser locking method of the invention the monitor port 20 is employed only during a turn-on resonance search for monitoring the output of the ring 18 as the laser 44 frequency is ramped. The threshold detector 64 passes only coresonance peaks, of which there are only a relatively few in the laser 44 gain width, and the servo amplifier 62 locks to one of the coresonance peaks.

The locking servo 62 then switches to the output from the sensing ring detector 60, which is at a resonant dip at coresonance, and the circuitry then ramps in a "fine scan" mode until a next ring 16 resonance is detected by detector 60. Due to the differences in diameter of the rings 16 and 18 the next ring 16 resonant frequency cannot also be a coresonant frequency with the ring 18. As this frequency is not a coresonance it has a high finesse, being undisturbed and not loaded by the presence of ring 18, now not resonating. This is the selected working point for the MOG 10. This working point is reproducible from run to run, thus improving scale factor as shown above.

It can be realized that the present invention differs from the teaching of the prior art, such as Malvern (U.S. Pat. No. 4,632,555), previously described. The invention employs the compound resonator output only in a tuning phase of the externally provided laser 44. In that the laser 44 is external to the resonator the system of the invention is not constrained to operate at this point. Thus, once a coresonance is acquired the laser 44 is preferably tuned to the next resonance of the rotation sensing ring 16. Monitor port 20 detectors 66 and 68 are provided for this purpose. Under these conditions, the secondary resonator 18 is off resonance and provides little or no loss, thereby not significantly degrading the MOG 10 performance.

While the invention has been particularly shown and described with respect to a preferred embodiment thereof, it will be understood by those skilled in the art that changes in form and details may be made therein without departing from the scope and spirit of the invention.

What is claimed is:

1. An optic gyroscope comprising:
   laser source means coupled to means for varying a frequency of an optical output of the laser source means;
   first resonator means coupled to the optical output of the laser source means for propagating a clockwise rotating radiation beam and a counter-clockwise rotating radiation beam both of which are derived from the laser source means optical output;
   first detector means optically coupled to the first resonator means for detecting an amount of energy associated with at least one of the propagating radiation beams;
   second resonator means, optically coupled to the first resonator means, for extracting a significant amount of energy from the first resonator means when a coresonance frequency condition exists with the first resonator means and for extracting an insignificant amount of energy from the first resonator means when a coresonance frequency condition does not exist with the first resonator means; and
   second detector means optically coupled to the second resonator means for detecting an amount of energy within the second resonator means; wherein
   the frequency varying means is coupled to an output of the second detector means and is responsive thereto for ramping the frequency of the laser source means to a first frequency substantially equal to a coresonance frequency, the frequency varying means further being coupled to an output of the first detector means and responsive thereto for further ramping the frequency of the laser source means to a second frequency that is not a coresonance frequency, the second frequency being a nominal operating frequency for the optical gyroscope, and for selecting the second frequency as a frequency for operation of the optical gyroscope.

2. An optic gyroscope as set forth in claim 1 wherein the laser source means is comprised of a semiconductor laser diode.

3. An optic gyroscope as set forth in claim 2 wherein the frequency varying means includes an amplifier means having an output coupled to the the semiconductor laser diode for varying the injection current thereof.

4. An optic gyroscope as set forth in claim 1 wherein the first and the second resonator means are each comprised of an optic waveguide means fabricated upon or within a surface of a common substrate.

5. An optic gyroscope as set forth in claim 4 wherein the substrate is comprised of an optical glass.

6. An optic gyroscope as set forth in claim 2 wherein the first and the second resonator means are each comprised of an optic waveguide means having a circular configuration of different diameters fabricated upon or within a surface of a common substrate and wherein the semiconductor laser diode has a nominal wavelength output of approximately 0.8 microns.

7. A method of tuning an optic gyroscope to an operating frequency within a predetermined range of operating frequencies, comprising the steps of:
   providing a compound resonator structure having a first resonator means optically coupled to a laser source means and a second resonator means optically coupled to the first resonator means, the second resonator means extracting a significant amount of energy from the first resonator means when a coresonance frequency condition exists with the first resonator means and for extracting an insignificant amount of energy from the first resonator means when a coresonance frequency condition does not exist with the first resonator means;
   ramping an output frequency of the laser source means to a first frequency where a coresonance frequency condition exists;
   further ramping the output frequency of the laser source to a second frequency where a resonance frequency condition exists within the first resonator means and a coresonance frequency condition does not exist between the first and the second resonator means, the second frequency being within the predetermined range of frequencies; and selecting the second frequency as a frequency for operation of the optic gyroscope.

8. A method as set forth in claim 7 wherein the steps of ramping and further ramping are accomplished after an initial step of energizing the gyroscope and before a step of employing the gyroscope to measure a rotational rate of a body to which the gyroscope is coupled.

9. A compound resonator gyroscope comprising:
a semiconductor laser having an electrical input coupled to means for a varying a frequency of an optical output of the laser;
first optic waveguide resonator means coupled to the optical output of the laser for propagating a clockwise rotating radiation beam and a counter-clockwise rotating radiation beam both of which are derived form the laser optical output;
first optic detector means optically coupled to the first resonator means for detecting an amount of energy associated with at least one of the propagating radiation beams;
second optic waveguide resonator means, optically coupled to the first resonator means and fabricated on a common substrate therewith, for extracting a significant amount of energy from the first resonator means only when a coresonance frequency condition exists with the first resonator means and for extracting an insignificant amount of energy from the first resonator means when a coresonance frequency condition does not exist with the first resonator means; and
second optical detector means optically coupled to the second resonator means for detecting an amount of energy within the second resonator means; wherein
the frequency varying means is coupled to an output of the second detector means and is responsive thereto for ramping the frequency of the optical output of the laser to a first frequency substantially equal to a coresonance frequency, the frequency varying means further being coupled to an output of the first detector means and responsive thereto for further ramping the frequency of the optical output of the laser to a second frequency that is not a coresonance frequency, the second frequency being a nominal operating frequency within a predetermined range of frequencies for obtaining a desired value of a scale factor associated with the optical gyroscope, and for selecting the second frequency as a frequency for operation of the optical gyroscope.

10. A compound resonator gyroscope as set forth in claim 9 wherein the second optical detector means includes threshold detector means coupled to an output thereof for passing to the frequency varying means only those detector outputs corresponding to a coresonance frequency condition.

* * * * *